United States Patent
Hsiao et al.

(10) Patent No.: US 7,101,093 B2
(45) Date of Patent: Sep. 5, 2006

(54) EXTENDING LATCH MECHANISM FOR A PLUGGABLE OPTICAL MODULE

(75) Inventors: Cheng-ta Hsiao, Hsinchu (TW); Cheng-Hung Tsai, Hsinchu (TW); Shun-Tien Lee, Hsinchu (TW); Chun-Sheng Lee, Hsinchu (TW)

(73) Assignee: Industrial Technology Research, Hsinchu (TW)

( * ) Notice: Subject to any disclaimer, the term of this patent is extended or adjusted under 35 U.S.C. 154(b) by 154 days.

(21) Appl. No.: 10/972,097

(22) Filed: Oct. 22, 2004

(65) Prior Publication Data
US 2006/0029335 A1    Feb. 9, 2006

(30) Foreign Application Priority Data
Aug. 6, 2004    (TW) .............................. 93123719 A (51) Int. Cl.
*G02B 6/36* (2006.01)

(52) U.S. Cl. ............................ 385/92; 385/88; 385/53; 385/139

(58) Field of Classification Search .................. 385/53, 385/60, 70, 72, 76, 77, 78, 80, 88, 92, 93, 385/94, 139
See application file for complete search history.

(56) References Cited

U.S. PATENT DOCUMENTS

| | | | |
|---|---|---|---|
| 6,439,918 B1 | 8/2002 | Togami et al. | 439/372 |
| 6,494,623 B1 | 12/2002 | Ahrens et al. | 385/53 |
| 6,533,603 B1 | 3/2003 | Togami | 439/372 |
| 6,692,159 B1 * | 2/2004 | Chiu et al. | 385/53 |
| 6,840,680 B1 * | 1/2005 | Chiu et al. | 385/53 |
| 6,851,867 B1 * | 2/2005 | Pang et al. | 385/88 |
| 7,004,647 B1 * | 2/2006 | Malagrino et al. | 385/92 |
| 2002/0150343 A1 | 10/2002 | Chiu et al. | 385/53 |
| 2004/0033027 A1 * | 2/2004 | Pang et al. | 385/53 |

* cited by examiner

*Primary Examiner*—Brian M. Healy
(74) *Attorney, Agent, or Firm*—Welsh & Katz (57) ABSTRACT

An extending latch mechanism for a pluggable optical module includes a resilient member and a lever coupling with each other. The lever is turnable to drive and deform the resilient member and to retract the resilient member transversely in the optical module so that the optical module may be removed directly. The structure is simple and easy to fabricate and assemble. It is reliable and convenient to use.

29 Claims, 8 Drawing Sheets

EXTENDING LATCH MECHANISM FOR A PLUGGABLE OPTICAL MODULE

FIELD OF THE INVENTION

The present invention relates to a latch mechanism for a pluggable optical module and particularly to an extending latch mechanism for a pluggable optical module that is reliable and convenient to use.

BACKGROUND OF THE INVENTION

In optical communication applications, the optical transceiver is an important element in the photoelectric transforming interface. Signal transmission speed may range from 155 Mb/s to 1.25 Gb/s or even 10 Gb/s. Various types of packages are available depending on application environments, such as 1×9 pin, GBIC (GigaBit Interface Converter), SFF (Small Form Factor), SFP (Small Form Factor Pluggable), and the like. 1×9 pin and SFF adopt a fixed packaging method that is difficult to remove once the module is installed in the system. GBIC and SFP adopt a pluggable approach that can be removed and replaced after installing in the system.

In the design of the pluggable module, many factors have to be considered, such as electricity issues while plugging the module, reliability and convenience of the plugging mechanism. For instance, U.S. Pat. Nos. 6,439,918 and 6,533,603 assigned to Finisar Co. disclose a SFP module that has a latching mechanism ramming the bottom of the module through a lever to extend or retract the latching mechanism in the module. U.S. Pat. No. 6,494,623 assigned to Infineon Co. also discloses a SFP release mechanism which has a lever turnable to press a locking reed of a transceiver to extend a latch of the module to escape a locking reed for releasing the module. Those references mostly employ latch mechanisms that are complex and require expensive elements. They also are difficult to fabricate and assemble.

SUMMARY OF THE INVENTION

In order to solve the aforesaid disadvantages, the present invention aims is to provide an extending latch mechanism for a pluggable optical module that is simply structured, easy to fabricate and assemble, reliable and convenient to use.

The extending latch mechanism for a pluggable optical module according to the invention includes a holding trough, a resilient member and a lever. The holding trough is formed on the optical module and has two ends. Each end has a latch notch, an extracting channel and a sloped surface abutting the latch notch. The resilient member is, located in the holding trough and has one end forming a latch section extending outside the latch notch and another end forming a driving portion extending outside the extracting channel, and a contact portion formed in the middle portion matching the sloped surface. The optical module is anchored on an electronic device through the latch section.

The driving portion has one end coupled on the lever. When the lever is turned relative to the optical module, the resilient member is stretched outwards and deformed, and the bent contact portion slides on the sloped surface to retract the distal end of the latch section into the holding trough to enable the optical module to be removed from the electronic device.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 4A through 6B are schematic views of the invention in operating condition.

DESCRIPTION OF THE PREFERRED EMBODIMENTS

The extending latch mechanism according to the invention is applicable to any pluggable optical module such as an optical transceiver, light emitter, optical receiver, and the like. The following discussion is based on an optical transceiver.

Figure 1:
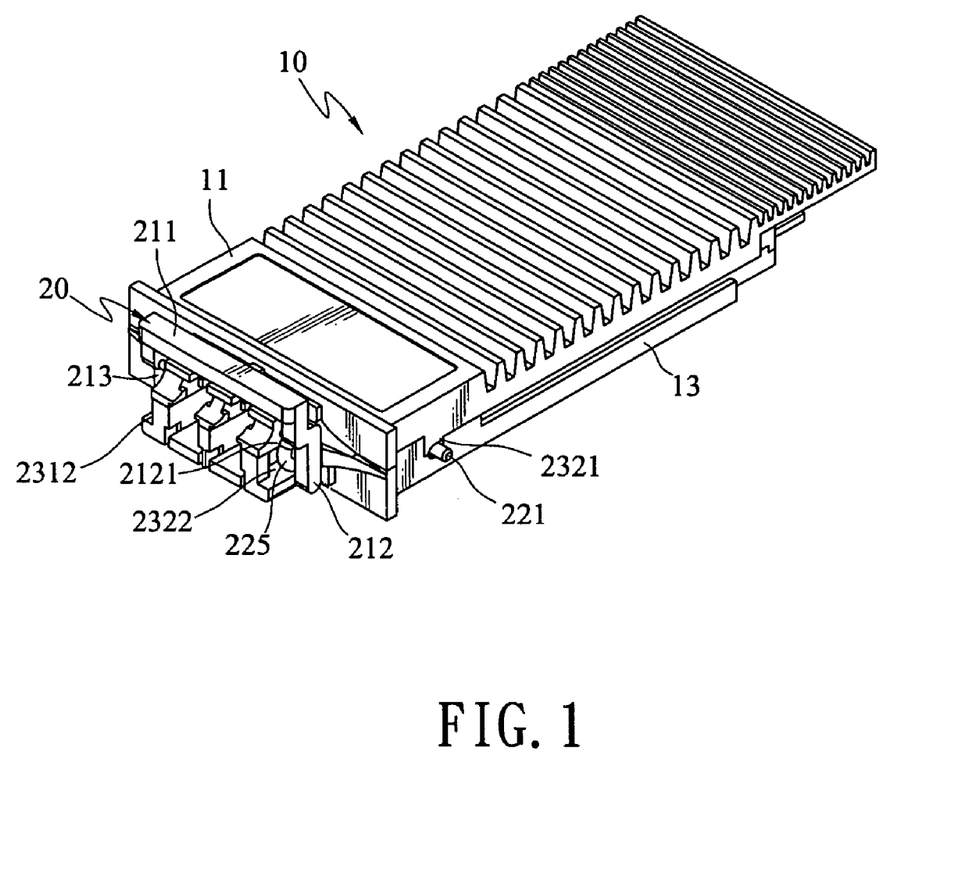
FIG. 1 is a schematic view of the invention coupled with an optical module.

Referring to FIG. 1, a latch mechanism 20 is adopted for use on an optical module 10 for selectively coupling the optical module 10 on an electronic device (not shown in the drawings). Also referring to FIG. 2, the optical module 10 includes an upper lid 11, a circuit board 12 and a lower lid 13. The latch mechanism 20 includes a lever 21, a resilient member 22 and a holding trough. The lever 21 is located on the front end of the optical module 10, and has a handle 211 and two struts 212 and 213 extended from two ends of the handle 211. The struts, 212 and 213, have a stub shaft, 2121 and 2131. The resilient member 22 is made of a material which has a desired elasticity and resiliently, such as metal, plastic or the like. It has two distal ends forming latch sections, 221 and 222, two bent contact portions, 224 and 223, abutting the latch sections, 221 and 222, and driving portions, 225 and 226, extended from the contact portions to become an integrated member. A holding trough 23 is provided to match and hold the resilient member 22. It has a first holding trough 231 and a second holding trough 232 matching the latch sections, 221 and 222, and the contact portions, 224 and 223.

Figure 2:
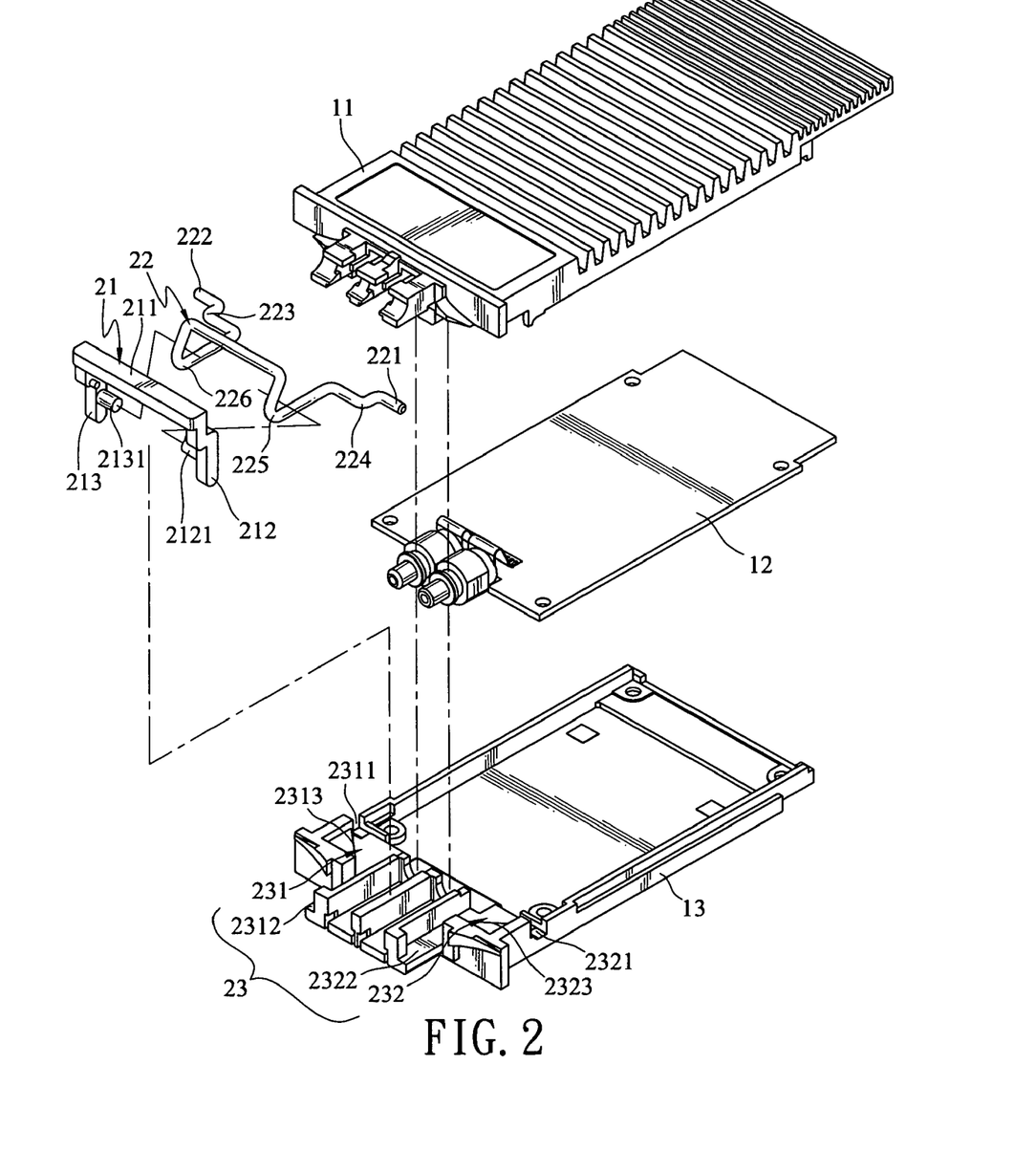
FIG. 2 is an exploded view of the invention coupled with an optical module.

The first holding trough 231 has two ends forming respectively a latch notch 2311 and an extracting channel 2312, and a sloped surface 2313 in the middle close to the latch notch 2311. Similarly, the second holding trough 232 has two ends forming respectively a latch notch 2321 and an extracting channel 2322, and a sloped surface 2323 in the middle close to the latch notch 2321.

Figure 3:
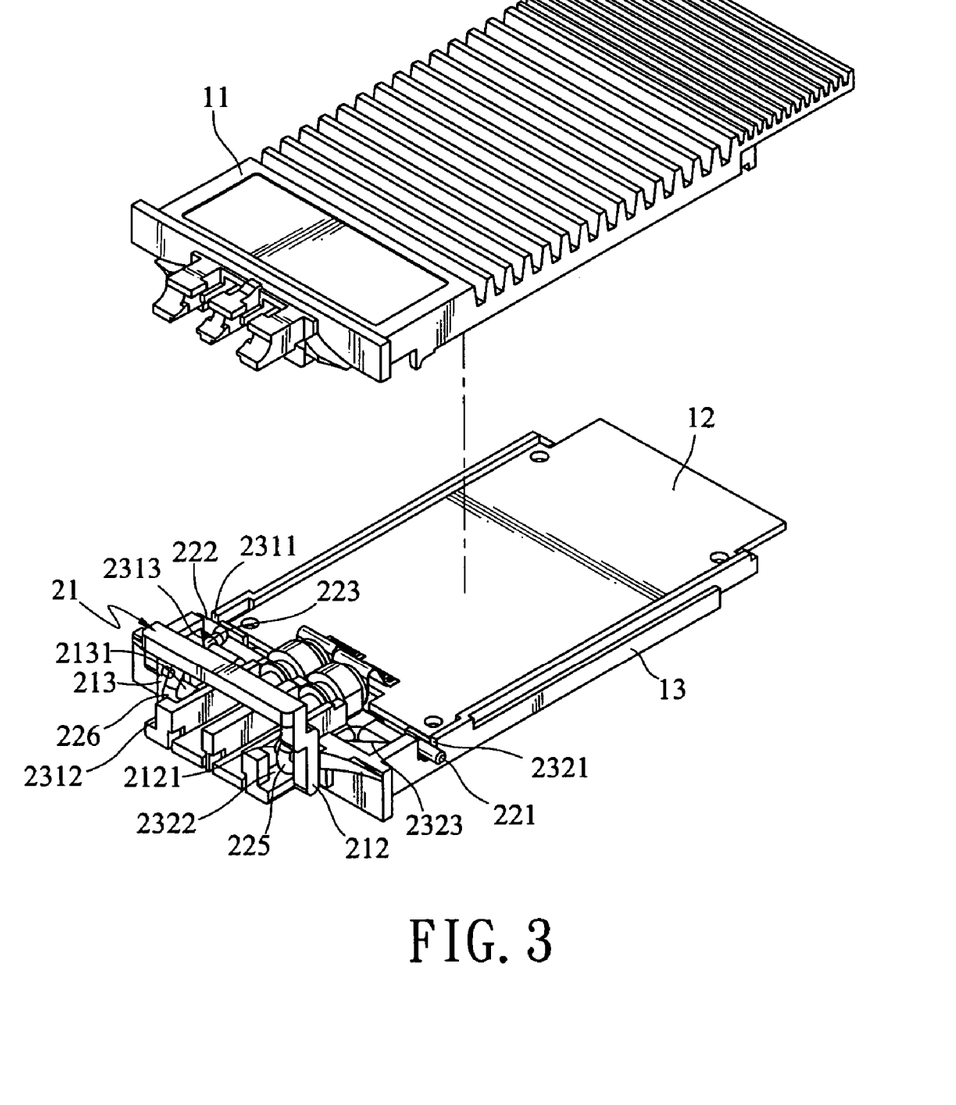
FIG. 3 is a fragmentary exploded view of the invention coupled with an optical module.

Referring to FIG. 3, the resilient member 22 is held in the holding trough 23 with the latch sections, 221 and 222, coupled on the latch notches, 2321 and 2311, and extended outside to anchor the optical module 10 (also referring to FIG. 1). The contact portions 223 and 224 press respectively the sloped surface 2313 of the first holding trough 231 and the sloped surface 2323 of the second holding trough 232. The driving portions 225 and 226 at the front are extended outside the retracting channels, 2322 and 2312, to couple on the stub shafts, 2121 and 2131, of the lever 21.

Figure 4A:
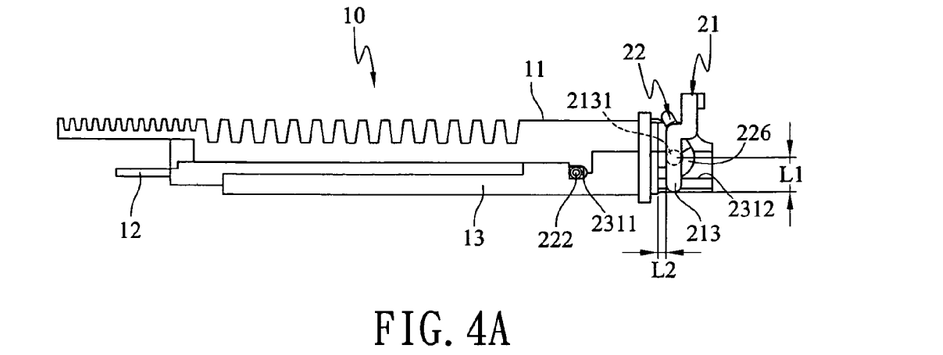
Figure 4B:
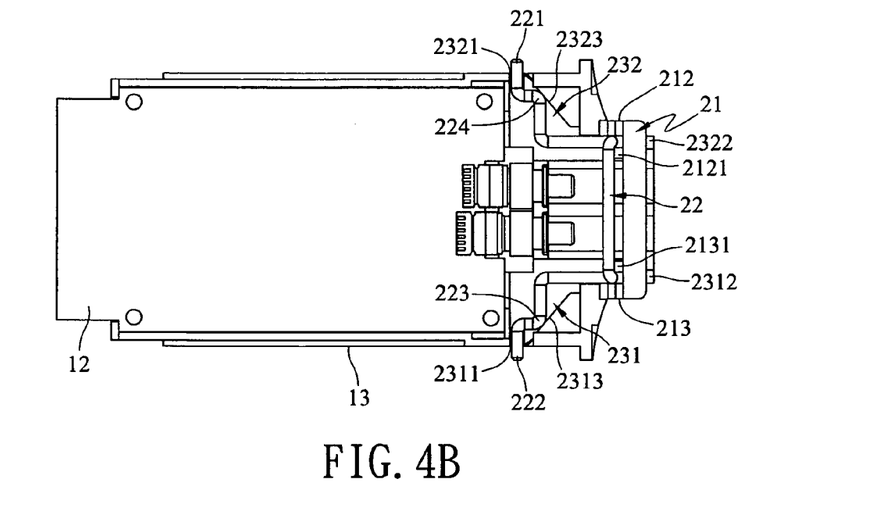

In normal condition, referring to FIGS. 4A and 4B, the resilient member 22 and the lever 21 are engaged, and the contact portions, 223 and 224, press the sloped surfaces, 2313 and 2323, to keep the lever 21 substantially in an upright condition, abutting the edge of the optical module 10, and the latch sections, 221 and 222, are extended.

Figure 5A:
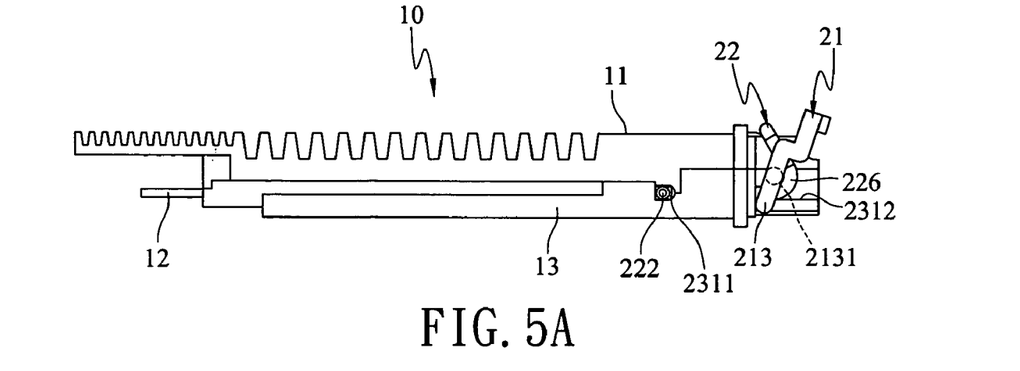
Figure 5B:
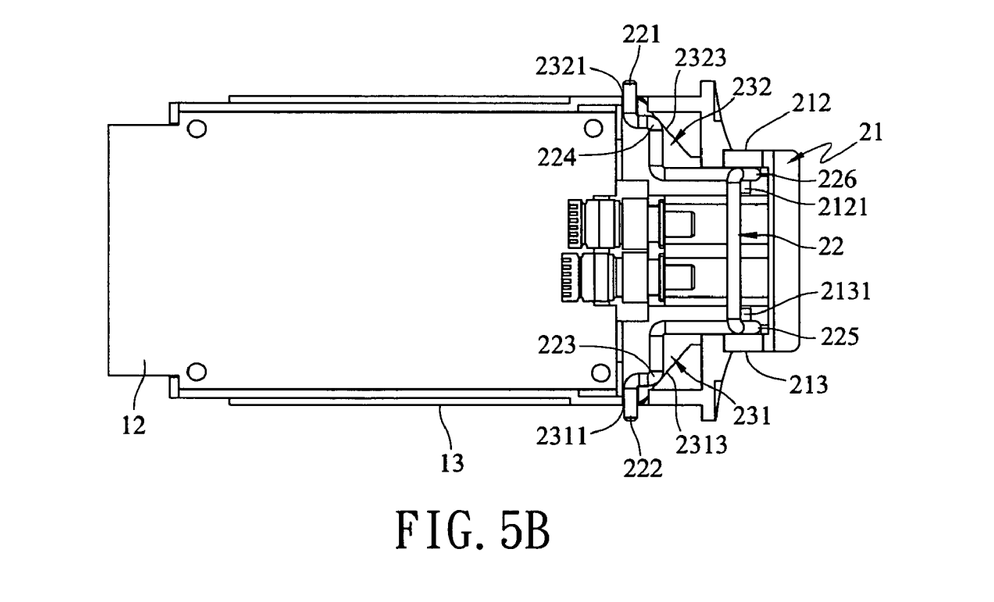
Figure 6A:
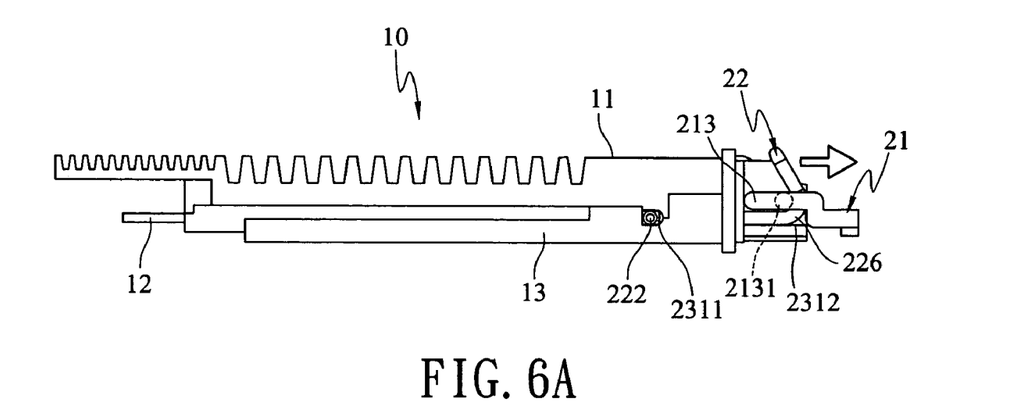
Figure 6B:
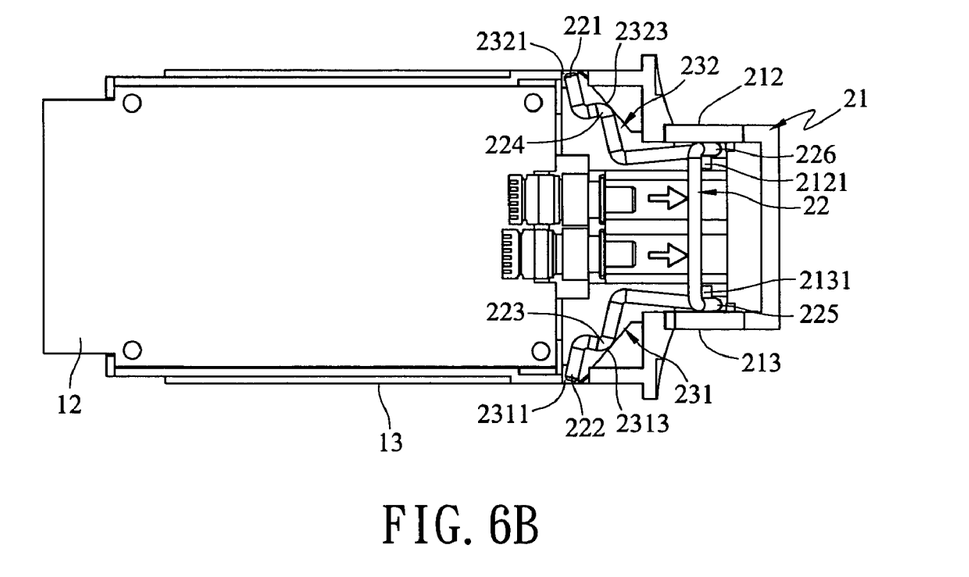

When the lever 21 is moved and turned about the stub shafts 2131 and 2121 relative to the optical module 10, the distal ends of the struts 212 and 213 contact the edge of the optical module 10 as shown in FIGS. 5A and 5B. As the distance L1 between the distal ends of the struts, 212 and 213, and the stub shafts, 2121 and 2131, is greater than the distance L2 of the stub shafts, 2121 and 2131, and the optical module 10 (namely the distance between the lever 21 and the side wall surface of the optical module 10, referring to FIG. 4A), when the lever 21 is turned continuously, it is urged by a reaction force to move the stub shafts, 2121 and 2131, outwards. Referring to FIGS. 6A and 6B, with the driving portions, 225 and 226, of the resilient member 22 coupled on the stub shafts, 2121 and 2131, the resilient member and the stub shafts also are moved outwards by the lever 21, and the contact portions, 223 and 224, are moved and slide on the sloped surfaces, 2313 and 2323, to force the resilient member 22 to deform. As a result, the latch sections, 221 and 222, at the distal ends are retracted from the latch notches, 2311 and 2321, into the first holding trough 231 and the second holding trough 232. Therefore the optical module 10 is separated from the electronic device.

Such a structure is simpler and requires fewer elements. It's cheaper. Fabrication and assembly also are easier. The resilient member 22 is not limited to the one shown in the drawings. It also may be a reed. The latch sections 221 and 222 also are not limited to extending outward. They may be formed in an up and down manner, or become a single latch section.

Figure 7:
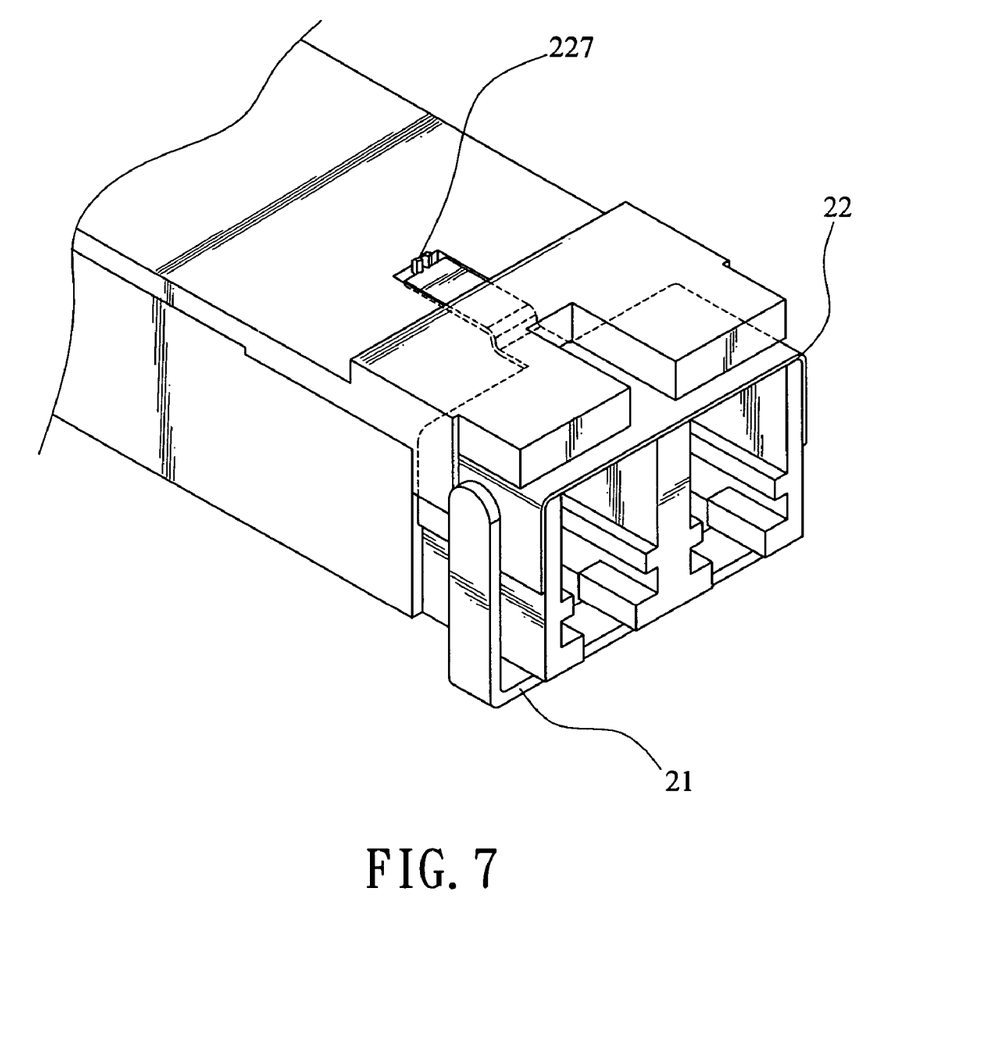
FIG. 7 is a schematic view of another embodiment of the invention coupled with an optical module.
Figure 8A:
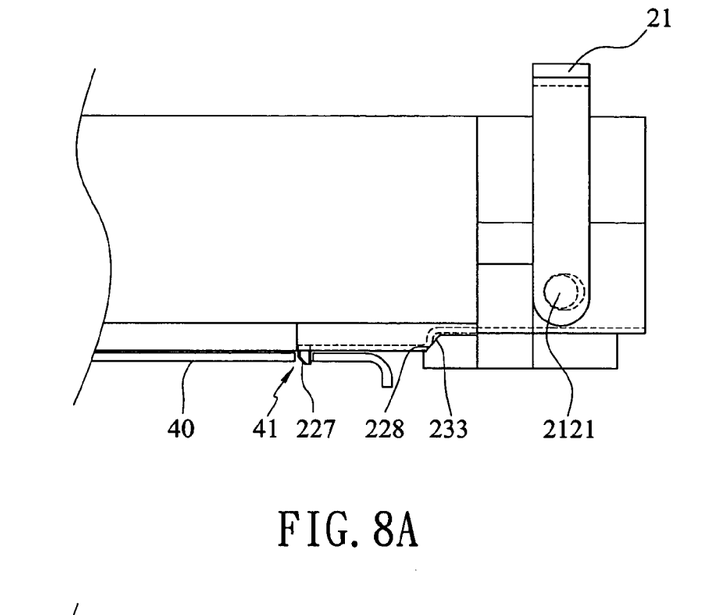
FIGS. 8A and 8B are schematic views of the invention shown in FIG. 7 in operating condition.
Figure 8B:
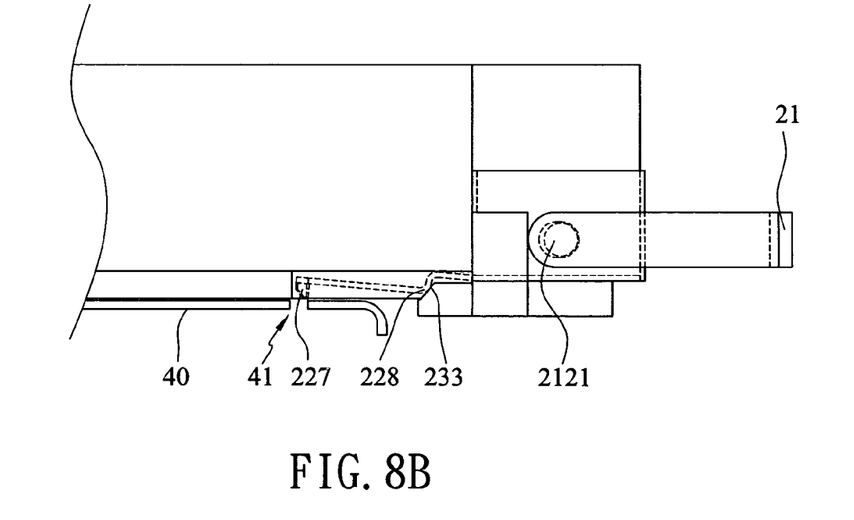

Refer to FIG. 7 for another embodiment of the invention. The lever 21 adopts the same principle set forth above. However, the resilient member 22 is an elastic reed located on one side of the optical module. It has a jutting latch section 227 on one side and a sloped surface 228 nearby (referring to FIG. 8A). In normal conditions, the contact portion 223 presses the sloped surface 233, and the latch section 227 latches in a latch trough 41 of an electronic device 40 to anchor the optical module on the electronic device 40. Referring to FIG. 8B, when the lever 21 is turned, the resilient member 22 is moved outwards and the contact portion 223 slides on the sloped surface 233 to deform the resilient member 22 so that the distal end of the latch section 227 is moved away from the latch trough 41.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An extending latch mechanism for a pluggable optical module to selectively couple the pluggable optical module on an electronic device, comprising:
   a holding trough located on the optical module having two ends each including a latch notch and an extracting channel, and a sloped surface abutting the latch notch;
   a resilient member located in the holding trough having a latch section on one end extending outside the latch notch and another end formed a driving portion extending outside the extracting channel, and a contact portion formed in a middle portion pressing the sloped surface; and
   a lever pivotally located on the optical module abutting the extracting channel turnable relative to the optical module to stretch the resilient member outwards through the driving portion to make the contact portion to slide on the sloped surface and the latch section to retract from the latch notch into the holding trough.

2. The extending latch mechanism of claim 1, wherein the latch notch and the retracting channel are located on two neighboring sides of the optical module and substantially normal to each other.

3. The extending latch mechanism of claim 1, wherein the resilient member is bent to form the contact portion.

4. The extending latch mechanism of claim 1, wherein the driving portion is formed by bending one end of the resilient member extended outside the retracting channel to couple on the lever.

5. The extending latch mechanism of claim 4, wherein the lever has a stub shaft and a strut connecting to the stub shaft, the driving portion being coupled with the stub shaft and keeping the lever close to the optical module in normal conditions.

6. The extending latch mechanism of claim 5, wherein the strut has a distal end spaced from the stub shaft at a distance greater than an interval between the lever and the optical module such that the lever is turnable about the stub shaft relative to the optical module to allow the strut to press the optical module to stretch the resilient member outwards through the driving portion.

7. The extending latch mechanism of claim 1, wherein the lever has a handle and a strut extended from the handle, the strut having a stub shaft located thereon to couple with the optical module and allow the lever to turn relative to the optical module.

8. The extending latch mechanism of claim 7, wherein the driving portion of the resilient member is coupled with the stub shaft to keep the lever close to the optical module in normal conditions.

9. The extending latch mechanism of claim 8, wherein the strut has a distal end spaced from the stub shaft at a distance greater than an interval between the lever and the optical module such that the lever is turnable about the stub shaft relative to the optical module to allow the strut to press the optical module to stretch the resilient member outwards through the driving portion.

10. The extending latch mechanism of claim 8 further having a sliding trough to hold the stub shaft and limit outward extending distance of the stub shaft and the lever.

11. An extending latch mechanism for a pluggable optical module to selectively couple the pluggable optical module on an electronic device, comprising:
    two holding troughs located on the optical module having respectively two ends each including a latch notch and an extracting channel, and a sloped surface abutting the latch notch;
    two resilient members located respectively in the holding troughs having a latch section on one end extending outside the latch notch and another end formed a driving portion extending outside the extracting channel, and a contact portion formed in a middle portion pressing the sloped surface; and
    a lever pivotally located on the optical module abutting the extracting channel turnable relative to the optical module to stretch the resilient member outwards through the driving portion to make the contact portion to slide on the sloped surface and the latch section to retract from the latch notch into the holding trough.

12. The extending latch mechanism of claim 11, wherein the two retracting channels are located on two neighboring sides.

13. The extending latch mechanism of claim 11, wherein the two latch notches are located on two opposite sides.

14. The extending latch mechanism of claim 11, wherein the two resilient members are extended from the driving portions and connected to each other.

15. The extending latch mechanism of claim 11, wherein the latch notch and the retracting channel are located on two neighboring sides of the optical module and substantially normal to each other.

16. The extending latch mechanism of claim 11, wherein the resilient member is bent to form the contact portion.

17. The extending latch mechanism of claim 11, wherein the driving portion is formed by bending one end of the resilient member extended outside the retracting channel to couple on the lever.

18. The extending latch mechanism of claim 17, wherein the lever has a stub shaft and a strut connecting to the stub shaft, the driving portion being coupled with the stub shaft and keeping the lever close to the optical module in normal conditions.

19. The extending latch mechanism of claim 18, wherein the strut has a distal end spaced from the stub shaft at a distance greater than an interval between the lever and the optical module such that the lever is turnable about the stub shaft relative to the optical module to allow the strut to press the optical module to stretch the resilient member outwards through the driving portion.

20. The extending latch mechanism of claim 11, wherein the lever has a handle and a strut extended from the handle, the strut having a stub shaft located thereon to couple with the optical module and allow the lever to turn relative to the optical module.

21. The extending latch mechanism of claim 20, wherein the driving portion of the resilient member is coupled with the stub shaft to keep the lever close to the optical module in normal conditions.

22. The extending latch mechanism of claim 21, wherein the strut has a distal end spaced from the stub shaft at a distance greater than an interval between the lever and the optical module such that the lever is turnable about the stub shaft relative to the optical module to allow the strut to press the optical module to stretch the resilient member outwards through the driving portion.

23. The extending latch mechanism of claim 22 further having a sliding trough to hold the stub shaft and limit outward extending distance of the stub shaft and the lever.

24. An extending latch mechanism for a pluggable optical module to selectively couple the pluggable optical module on an electronic device, comprising:
   a holding trough located on the optical module having one end which includes a latch notch and a sloped surface abutting the latch notch;
   a resilient member coupled on the optical module having a latch section on one end extending outside the latch notch and a contact portion formed in a middle portion pressing the sloped surface; and
   a lever pivotally located on the optical module and coupled on the resilient member turnable relative to the optical module to stretch the resilient member outwards to make the contact portion to slide on the sloped surface and the latch section to retract from the latch notch into the holding trough.

25. The extending latch mechanism of claim 24, wherein the resilient member is bent to form the contact portion.

26. The extending latch mechanism of claim 24, wherein the lever has a handle and a strut extended from the handle, the strut having a stub shaft located thereon to couple with the optical module and allow the lever to turn relative to the optical module.

27. The extending latch mechanism of claim 26, wherein the strut has a distal end spaced from the stub shaft at a distance greater than an interval between the lever and the optical module such that the lever is turnable about the stub shaft relative to the optical module to allow the strut to press the optical module to stretch the resilient member outwards.

28. The extending latch mechanism of claim 26 further having a sliding trough to hold the stub shaft and limit outward extending distance of the stub shaft and the lever.

29. The extending latch mechanism of claim 24, wherein the resilient member is reedlike.

* * * * *